United States Patent [19]

Hegele

[11] 3,835,958

[45] Sept. 17, 1974

[54] PORTABLE STEP AND A STAND FOR USE IN HUNTING WILDLIFE INCLUDING THE SAME

[76] Inventor: Arnold C. Hegele, 401 W. Locust St., Canton, Ill. 61520

[22] Filed: July 31, 1973

[21] Appl. No.: 384,238

[52] U.S. Cl. .................................. 182/92, 182/189
[51] Int. Cl. ............................................ E06c 9/04
[58] Field of Search ........ 182/92, 82, 189; 248/243, 248/247; 249/219 W

[56] References Cited
UNITED STATES PATENTS

| | | | |
|---|---|---|---|
| 907,483 | 12/1908 | Ette | 182/90 |
| 1,427,030 | 8/1922 | Stephens et al. | 182/90 |
| 2,321,916 | 6/1943 | Ingerman | 182/82 |
| 2,888,298 | 5/1959 | Purswell | 182/82 |
| 3,030,059 | 4/1962 | Jahn | 249/219 W |
| 3,498,016 | 3/1970 | Nowak | 248/243 |
| 3,510,097 | 5/1970 | McCaleb | 248/243 |

Primary Examiner—Reinaldo P. Machado
Attorney, Agent, or Firm—L. S. Van Landingham, Jr.

[57] ABSTRACT

Portable steps are provided which are adapted to be detachably mounted on the trunk of a tree at progressively increasing heights to thereby allow the tree to be easily climbed. The invention also provides a stand for use in hunting wildlife which includes a plurality of the portable steps detachably mounted on the trunk of a tree at progressively increasing heights and arranged whereby a person climbing the tree may step from a lower step to the next higher step and thereby climb the tree from the ground level to the desired stand height. In a preferred embodiment, a seat is provided including an elongated seating member which is supported by at least two of the steps arranged circumferentially on the tree trunk in spaced relationship at approximately the same height. The portable steps are especially useful in constructing temporary deer stands and the equipment needed therefor may be easily transported from one location to another by a deer hunter to take advantage of the best hunting conditions.

14 Claims, 4 Drawing Figures

PATENTED SEP 17 1974　　　3,835,958
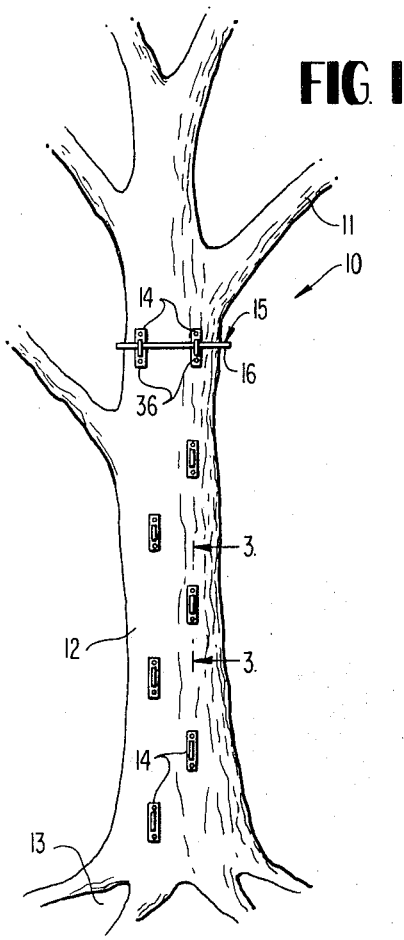
FIG. 1
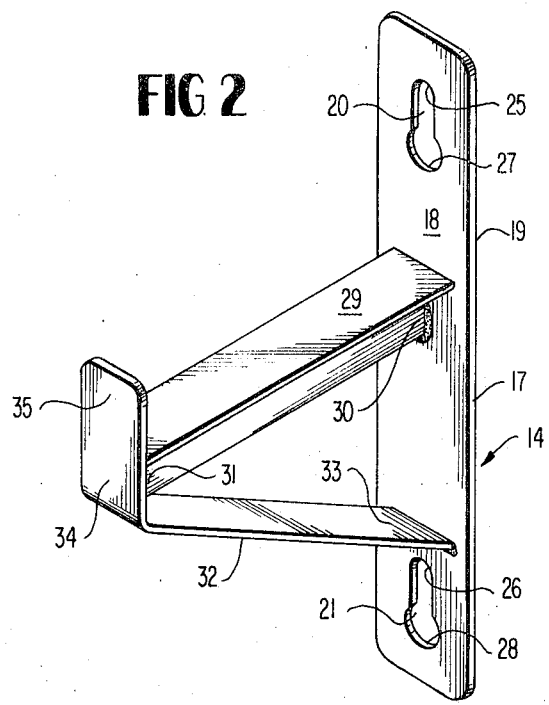
FIG. 2
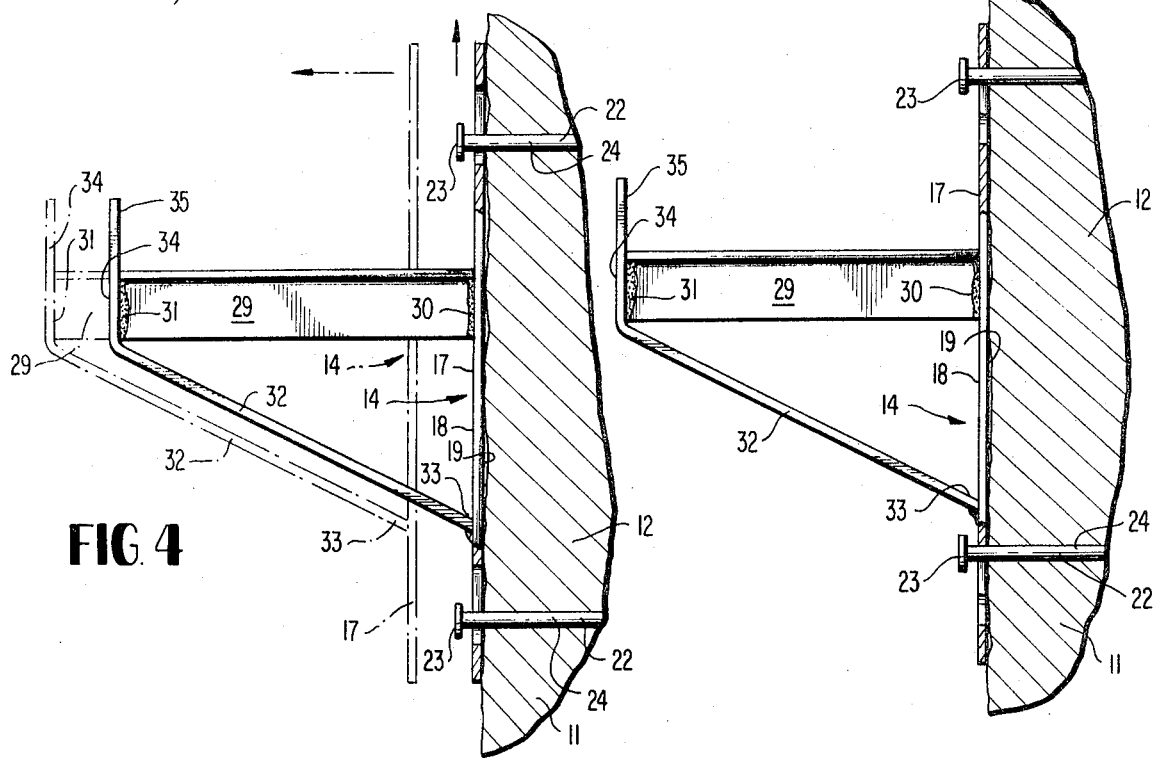
FIG. 3
FIG. 4

PORTABLE STEP AND A STAND FOR USE IN HUNTING WILDLIFE INCLUDING THE SAME

BACKGROUND OF THE INVENTION

This invention relates to an improved portable step which is adapted to be detachably mounted on the trunk of a tree. The invention further relates to a stand for use in hunting wildlife which includes a plurality of the portable steps of the invention.

It is often desirable to provide a stand for hunters of wildlife such as deer and other relatively large animals. The elevated vantage point of a stand has a number of advantages such as minimizing the chances of being seen by the wildlife being hunted while maximizing the chances of obtaining a clear shot at the quarry.

In the past, hunters have solved the problem of providing a stand by merely climbing a tree of sufficiently small size having limbs conveniently arranged for ease of climbing. Frequently, trees having the desired characteristics are not available at the most likely sites for a successful stand and accordingly there has been a long standing need for devices which enable a hunter to climb substantially any desired tree. However, the devices available prior to the present invention were not entirely satisfactory due to, among other reasons, the devices being too bulky or heavy for a hunter to carry. In other instances, the devices could not be readily attached and detached to a tree trunk or used in providng a comfortable seat for the hunter at a desired stand height.

The present invention overcomes the above and still other disadvantages, and provides for the first time entirely satisfactory portable steps which are useful in constructing temporary stands for hunting wildlife. The steps may be easily transported from one location to another to take advantage of the best hunting conditions available in a given locality. The steps also are useful for supporting a seat at a desired height in the tree selected for use as a stand, and this is a further important advantage as the seat greatly increases the comfort of a hunter during long hours of waiting for the quarry.

OBJECTS OF THE INVENTION

It is an object of the present invention to provide a portable step which is adapted to be detachably mounted on the trunk of a tree.

It is a further object to provide a stand for use in hunting wildlife which includes a plurality of the portable steps of the invention detachably mounted on the trunk of a tree at progressively increasing heights and arranged whereby a person may climb the tree from the ground level to the desired stand height.

It is still a further object to provide a stand for use in hunting wildlife which also includes a seat in a tree at a desired height supported by at least two of the portable steps of the invention.

It is still a further object to provide portable steps useful in constructing temporary deer stands which may be easily transported from one location to another by a deer hunter to take advantage of the best hunting conditions.

Still other objects and advantages of the invention will be apparent to those skilled in the art upon reference to the following detailed description and the accompanying illustrative drawings.

BRIEF DESCRIPTION OF THE DRAWINGS

FIG. 1 is a view in elevation of a stand for hunting wildlife constructed in accordance with the invention, including a tree, with portions thereof being broken away, illustrating the manner of detachably mounting a plurality of the portable steps of the invention on the trunk at progressively increasing heights to thereby allow the tree to be easily climbed, and further illustrating the preferred embodiment of the invention wherein a seat is provided at the desired stand height;

FIG. 2 is a perspective view of one of the portable steps illustrated in FIG. 1;

FIG. 3 is a cross-sectional view taken along the line 3—3 of FIG. 1, with portions thereof being broken away, illustrating the manner of mounting the portable steps on the tree trunk; and FIG. 4 is a view similar to FIG. 3 and including a further view in phantom line illustrating the manner of attaching and detaching the steps to the tree trunk.

DETAILED DESCRIPTION OF THE INVENTION INCLUDING PREFERRED EMBODIMENTS THEREOF

Referring now to the drawings, the stand for hunting wildlife generally designated as 10 includes a tree 11 having a trunk 12 which extends upwardly from the ground level 13. A plurality of portable steps 14 are detachably mounted on the trunk 12 at progressively increasing heights from the ground level 13, and are arranged whereby a person climbing the tree may progressively step from a lower step to the next higher step and thereby climb the tree from the ground level 13 to the seat 15. Preferably, the portable steps are arranged alternately to the left and right of a vertical plane (not shown) passing through the center of the tree trunk and at progressively increasing heights until the highest step allows a hunter to easily reach seat 15.

The seat 15 is located on the trunk 12 at a desired stand height to provide a suitable elevated vantage point for hunters of wildlife such as deer and other relatively large animals for the purpose of minimizing the chances of being seen and maximizing the chances of obtaining a clear shot at the quarry. The seat 15 includes two additional portable steps 14 and a short piece of plank 16. The two additional steps 14 are arranged on the trunk 12 in spaced relationship at approximately the same height from the ground level 13 whereby the portable steps 14 lie in approximately the same horizontal plane and the plank 16 extends horizontally therebetween and is supported thereby to form the seat 15.

The steps 14 are adapted to be detachably mounted on the trunk 12 of tree 11 and include an elongated mounting member 17 having front and back sides 18 and 19, respectively. The mounting member 17 is shaped whereby the back side 19 thereon may be positioned against the trunk 12 as shown in FIGS. 1, 2 and 3 of the drawings. The mounting member 17 has upper and lower spaced openings 20 and 21, respectively, formed therein which are adapted to receive detachable fastening devices whereby the portable steps 14 may be detachably mounted on the trunk 12. As is best seen in FIGS. 3 and 4, the detachable mounting devices are preferably nails or spikes 22 which have enlarged portions or heads 23 on the outer ends thereof.

The nails or spikes 22 are partially driven into the wood of trunk 12 and the outer ends thereof project outward a distance sufficient to pass through upper and lower openings 20 and 21. The main body portions 24 of nails or spikes 22 are relatively slender and have diameters sufficiently small to pass easily through the relatively narrow upper portions 25 and 26 of openings 20 and 21 respectively, whereas the heads 23 have sufficiently large diameters to prevent their passing therethrough. However, the heads 23 have sufficiently small diameters to pass easily through the relatively large lower portions 27 and 28 of openings 20 and 21. This arrangement allows the heads 23 to be inserted through the lower portions 27 and 28 of openings 20 and 21, and the mounting member 17 to be moved downward whereby the main body portions 24 pass into the upper portions 25 and 26 of openings 20 and 21 and thereby detachably affix mounting member 17 to the trunk 12. The mounting member 17 may be detached from the trunk 12 by moving the mounting member 17 upward from the position illustrated in FIG. 3 to the position illustrated in FIG. 4, whereby the heads 23 are in alignment with the lower portions 27 and 28 of openings 20 and 21, and then pulling outward as shown in phantom line in FIG. 4.

An elongated foot supporting member 29 having first and second end portions 30 and 31, respectively is provided which preferably has a generally T-shaped cross section. The first end portion 30 is attached by welding to the front side 18 of mounting member 17 and extends outward therefrom and preferably forms approximately a 90° angle therewith. As is best seen in FIG. 2, the T-shaped cross section of the foot supporting member 29 is in the upright position when the mounting member 17 and the portable step are likewise in the upright position.

The elongated strip-like bracing member 32 is attached to mounting member 17 by welding its first end portion 33 to the front side 18 at a point substantially below the point of attachment of foot supporting member 29. The bracing member 32 extends outward and upward from its point of attachment to mounting member 17, and its second end portion 34 is attached to the second end portion 31 of foot supporting member 29 by welding. The outermost end portion 35 of bracing member 32 extends upward past the upper surface of foot supporting member 29 a distance sufficient to prevent the foot of a person using the portable step from slipping past the second end portion 31 of foot supporting member 29. Inasmuch as the bracing member 32 extends outward from its point of attachment to mounting member 17 and in a direction generally toward the second end portion 31 of foot supporting member 29 and is rigidly attached thereto by welding, the foot supporting member is effectively braced thereby and the foot supporting member is strong enough to support the weight of a person using the step 14.

Preferably, the portable steps 14 are constructed of metal but other suitable materials may be used. The mounting member 17 and the bracing member 32 preferably are formed from elongated metallic strips of suitable width and length and shaped as illustrated in the drawings. The foot supporting member 29 is preferably constructed from an elongated metallic shape having a generally T-shaped cross section so as to provide more compressive strength per unit weight. The foot supporting member 29 and the bracing member 32 are joined to the mounting member 17 and to each other by welding or by other suitable techniques allowing rigid joints to be made which result in increased strength of the overall step 14. The configuration and construction of the portable steps 14 are such that great strength per unit weight is achieved.

The weight per step may be reduced to one pound or less and a hunter may carry a sufficient number to allow climbing of the average tree. Also, the nails or spikes 22 which are needed for detachably mounting the portable steps 14 weight very little and may be carried by the hunter. The only additional equipment that is needed is a hammer, and, if desired, a short length of plank 16 for constructing the seat 15 which likewise may be easily carried by the hunter.

It is understood that the step 14 may be of any suitable size, and that the component parts thereof may be formed from any suitable materials. However, it is usually preferred that steel be used as the material of construction. In such instances, the mounting member may be formed from a steel strip approximately 1.5 inches wide and 9 inches in length. The foot supporting member 29 may be formed from a steel shape having a T-shaped cross section, wherein the horizontal and vertical cross sectional portions of the T each measure approximately one inch and the overall length of member 29 may be approximately 5 inches. The bracing member 32 may be formed from a steel strip having a width of approximately 1 inch and a length sufficient to extend outward and upward from its point of attachment to member 17 and approximately 1 inch past the upper surface of the second end portion of foot supporting member 29, as shown in the drawings. The bracing member 32 may be attached to mounting member 17 approximately 2 inches from the bottom thereof, and the horizontal upper surface of foot supporting member may be attached at a point approximately 3 inches from the top of mounting member 17, with the vertical body portion of the T extending downward therefrom. The mounting member 17, the horizontal and vertical cross sectional portions of foot supporting member 29, and the bracing member 32 each may have a thickness of approximately 0.12 inch. When the foregoing construction is used and steel is the material of construction, the portable step weighs approximately 1 pound. In instances where aluminum, magnesium or alloys thereof are used in constructing the step, then the weight is considerably less but the cost of construction is increased due to the higher cost of materials and labor.

The above described steps 14 may be easily installed on the trunk 12 of a selected tree 11 by means of nails or spikes 22 having a length of approximately 2.5–3 inches using only a hammer as a necessary tool. A first nail 22 is partially driven into the trunk 12 at a suitable height for the lowermost step and the outer end of the nail is allowed to extend from the tree trunk approximately 3/16–¼ inch. A step 14 is hung from the first nail by inserting the nail head 23 through enlarged portion 27 of opening 20, and then moving the mounting member 17 downward so as to cause the main body portion 24 of nail 22 to pass upward into portion 25 of opening 20. Then, while maintaining the mounting member 17 in a generally upright position, a second nail 22 is driven into the upper portion 26 of opening 21 to thereby complete the mounting of the lowermost step 14. The lowermost step 14 may be released when desired by pulling upward on the same, so as to position the nail heads 23 as shown in FIG. 4 of the drawings, and then pulling outward on the same as shown in phantom line in FIG. 4. The above procedure is repeated to install additional steps 14 to the left and right of a vertical plane passing through the center of the tree, as illustrated in FIG. 1 of the drawings, as suitable intervals such as 1.5–2 feet. The lower steps thus installed may be stood upon by the person installing the same when installing the upper steps 14. Similarly, seat 15 may be installed by standing upon the upper steps 14. After using the stand 10, it may be disassembled by reversing the above described procedure for assembling the same. For instance, the plank 16, which extends between and is supported by the spaced portable steps 36, may be removed by standing upon the upper steps 14 and lifting upward thereon. The portable steps 36 may be removed by standing upon the upper steps 14 and by pushing upward and lifting outward thereon. Thereafter the tree may be gradually descended step by step while removing the remaining uppermost step in each instance until the ground level 13 is reached. The nails or spikes 22 may be left in the tree trunk in the event the tree 11 is to be used as a stand 10 at some future date, or the nails 22 may be removed with a claw hammer at the time of removing the portable steps.

As will be apparent from the foregoing discussion, a hunter normally will select a tree of suitable height and diameter for use as a stand, and then install a sufficient number of the portable steps 14 to reach the desired stand height following the aforementioned installation procedure. Once installed the steps 14 may be allowed to remain in place and in such event the steps 14 may be used in climbing the tree 11 as often as desired. However, in most instances, a hunter will remove the seat 15 and the steps 14 upon descending the tree and thereafter use them in a different location. This allows the hunter to take advantage of the best hunting conditions in a given locality. The portable steps 14 may be used in constructing a deer stand, or a stand for hunting other species of large animals or wildlife in general. Additionally, the portable steps also may be used in climbing poles and the like, and reference made herein to climbing trees is intended to embrace the same.

The foregoing detailed description of the preferred embodiments of the invention and the accompanying drawings are for purposes of illustration only, and are not intended to be limiting to the appended claims.

I claim:

1. A portable step adapted to be detachably mounted on the trunk of a tree comprising an elongated mounting member having front and back sides and first and second end portions, the mounting member being shaped whereby the back side thereof may be positioned against the trunk of a tree, the mounting member having at least two spaced openings formed therein, one of said openings being located in the first end portion and the other of said openings being located in the second end portion, each of said openings being adapted to receive a detachable fastening means whereby the portable step may be detachably mounted thereon on a tree trunk, an elongated foot supporting member having first and second end portions and a reinforcing flange thereunder and secured thereto, means for attaching the first end portion of the foot supporting member to the front side of the mounting member, an elongated bracing member having first and second end portions, means for attaching the first end portion of the bracing member to the front side of the mounting member, the first end portions of the supporting member and the bracing member being attached to the front side of the mounting member at points thereon which are spaced a substantial distance apart, the foot supporting member extending outward from its point of attachment to the mounting member and forming approximately a 90° angle therewith, the bracing member extending outward from its point of attachment to the mounting member and in a direction generally toward the second end portion of the foot supporting member, and means for attaching the second end portion of the bracing member to the second end portion of the foot supporting member to thereby brace the foot supporting member and allow it to support the weight of a person using the portable step, the second end portion of the bracing member extending upward from its point of attachment to the second end portion of the foot supporting member a distance sufficient to prevent the foot of a person using the step from slipping past the second end portion of the foot supporting member.

2. The step of claim 1 wherein the foot supporting member and the bracing member are attached to the front side of the mounting member at points located between the said openings.

3. The step of claim 1 wherein the elongated mounting member is arranged in a generally upright position and is provided with at least two spaced longitudinally extending slot-like openings having upper and lower ends, the lower ends of each of the said slots being wider than the upper ends thereof whereby a pair of spaced elongated fastening means having (a) enlarged outer end portions of a width greater than the said upper ends of the slots but less than the width of the said lower ends of the slots, and (b) inner end portions of a width less than the lower and upper ends of the slots, may be inserted through the said lower ends of the slots and the mounting member may be moved downward to position the said inner end portions in the said upper end portions of the slots with the said outer end portions extending past the upper end portions of the slots to thereby detachably mount the step.

4. The step of claim 1 wherein the mounting member is an elongated strip arranged in a generally upright position and shaped along its backside to conform to the trunk of a tree, the foot supporting member has a generally T-shaped transverse cross section and is arranged whereby the T is in a generally upright position and the top of the T supports the foot of a person using the step, and the bracing member is an elongated strip.

5. The step of claim 4 wherein the mounting member is provided with at least two spaced longitudinally extending slot-like openings having upper and lower ends, the lower ends of each of the said slots being wider than the upper ends thereof whereby a pair of spaced elongated fastening means having (a) enlarged outer end portions of a width greater than the said upper ends of the slots but less than the width of the said lower ends of the slots, and (b) inner end portions of a width less than the lower and upper ends of the slots, may be inserted through the said lower ends of the slots and the mounting member may be moved downward to position the said inner end portions in the said upper end portions of the slots with the said outer end portions extending past the upper end portions of the slots to thereby detachably mount the step.

6. The step of claim 5 wherein the foot supporting member and the bracing member are attached to the front side of the mounting member at points located between the said openings.

7. A stand for use in hunting wildlife comprising
a tree having an upwardly extending trunk,
a plurality of portable steps detachably mounted on the trunk at progressively increasing heights,
the steps being arranged whereby a person climbing the tree may progressively step from a lower step to the next higher step and thereby climb the tree from the ground level to the desired stand height, the portable steps comprising
an elongated mounting member having front and back sides and first and second end portions,
the mounting member being shaped whereby the back side thereof may be positioned against the trunk of the tree,
the mounting member having at least two spaced openings formed therein,
one of said openings being located in the first end portion and the other of said openings being located in the second end portion,
each of said openings being adapted to receive a detachable fastening means whereby the portable step may be detachably mounted thereby on the tree trunk,
an elongated foot supporting member having first and second end portions and a reinforcing flange thereunder and secured thereto,
means for attaching the first end portion of the foot supporting member to the front side of the mounting member,
an elongated bracing member having first and second end portions,
means for attaching the first end portion of the bracing member to the front side of the mounting member,
the first end portions of the supporting member and the bracing member being attached to the front side of the mounting member at points thereon which are spaced a substantail distance apart,
the foot supporting member extending outward from its point of attachment to the mounting member and forming approximately a 90° angle therewith, the bracing member extending outward from its point of attachment to the mounting member and in a direction generally toward the second end portion of the foot supporting member, and
means for attaching the second end portion of the bracing member to the second end portion of the foot supporting member to thereby brace the foot supporting member and allow it to support the weight of a person using the portable step,
the second end portion of the bracing member extending upward from its point of attachment to the second end portion of the foot supporting member a distance sufficient to prevent the foot of a person using the step from slipping past the second end portion of the foot supporting member,
a plurality of elongated fastening means anchored in the tree trunk at progressively increasing heights, and
the fastening means being arranged and adapted to cooperate in a detachable manner with the said spaced openings in the mounting members and the steps being detachably mounted thereon.

8. The stand of claim 7 wherein the foot supporting member and the bracing member of the steps are attached to the front side of the mounting member at points located between the said openings.

9. The standing of claim 7 wherein the elongated mounting member of the steps is arranged in a generally upright position and is provided with at least two spaced longitudinally extending slot-like openings having upper and lower ends, the lower ends of each of the said slots being wider than the upper ends thereof whereby a pair of spaced elongated fastening means having (a) enlarged outer end portions of a width greater than the said upper ends of the slots but less than the width of the said lower ends of the slots, and (b) inner end portions of a width less than the lower and upper ends of the slots, may be inserted through the said lower ends of the slots and the mounting member may be moved downward to position the said inner end portions in the said upper end portions of the slots with the said outer end portions extending past the upper end portions of the slots to thereby detachably mount the steps.

10. The stand of claim 7 wherein the mounting member of the steps is an elongated strip arranged in a generally upright position and shaped along its backside to conform to the trunk of the tree, the foot supporting member has a generally T-shaped transverse cross section and is arranged whereby the T is in a generally upright position and the top of the T supports the foot of a person using the steps, and the bracing member is an elongated strip.

11. The stand of claim 10 wherein the mounting member of the steps is provided with at least two spaced longitudinally extending slot-like openings having upper and lower ends, the lower ends of each of the said slots being wider than the upper ends thereof whereby a pair of spaced elongated fastening means having (a) enlarged outer end portions of a width greater than the said upper ends of the slots but less than the width of the said lower ends of the slots, and (b) inner end portions of a width less than the lower and upper ends of the slots, may be inserted through the said lower ends of the slots and the mounting member may be moved downward to position the said inner end portions in the said upper end portions of the slots with the said outer end portions extending past the upper end portions of the slots to thereby detachably mount the steps.

12. The stand of claim 11 wherein the foot supporting member and the bracing member of the steps are attached to the front side of the mounting member at points located between the said openings.

13. The stand of claim 7 wherein seat means is provided at a desired height in the tree, the seat means including at least two additional portable steps of the said construction and an elongated seating member, the said two additional steps being arranged on the trunk in spaced relationship and at approximately the same height whereby the foot supporting members thereof lie in approximately the same horizontal plane, and the seating member extending between the foot supporting members of the said two additional steps and being support thereby to form a seat.

14. The stand of claim 12 wherein seat means is provided at a desired height in the tree, the seat means including at least two additional portable steps of the said construction and an elongated seating member, the said two additional steps being arranged on the trunk in spaced relationship and at approximately the same height whereby the foot supporting members thereof lie in approximately the same horizontal plane, and the seating member extending between the foot supporting members of the said two additional steps and being supported thereby to form a seat.

* * * * *